United States Patent
Barri et al.

(10) Patent No.: US 8,045,549 B2
(45) Date of Patent: Oct. 25, 2011

(54) METHOD AND APPARATUS FOR PACKET REORDERING IN A NETWORK PROCESSOR

(75) Inventors: Peter Irma August Barri, Bonheiden (BE); Miroslav Vrana, Ghent (BE); Robert Elliott Robotham, Ottawa (CA)

(73) Assignee: Alcatel Lucent, Paris (FR)

(*) Notice: Subject to any disclaimer, the term of this patent is extended or adjusted under 35 U.S.C. 154(b) by 2426 days.

(21) Appl. No.: 10/389,929

(22) Filed: Mar. 18, 2003

(65) Prior Publication Data
US 2003/0189931 A1    Oct. 9, 2003

(30) Foreign Application Priority Data
Apr. 3, 2002  (EP) ...................................... 02290817

(51) Int. Cl.
*H04L 12/28*  (2006.01)
(52) U.S. Cl. ........................................ 370/389; 370/474
(58) Field of Classification Search .................. 370/389, 370/394, 412, 474
See application file for complete search history.

(56) References Cited

U.S. PATENT DOCUMENTS

| | | | | |
|---|---|---|---|---|
| 4,581,734 A | * | 4/1986 | Olson et al. | 370/412 |
| 5,150,358 A | * | 9/1992 | Punj et al. | 370/418 |
| 5,278,830 A | | 1/1994 | Kudo | |
| 5,666,161 A | * | 9/1997 | Kohiyama et al. | 375/240.18 |
| 5,894,586 A | * | 4/1999 | Marks et al. | 710/28 |
| 5,926,459 A | * | 7/1999 | Lyles et al. | 370/230 |
| 6,000,053 A | * | 12/1999 | Levine et al. | 370/470 |
| 6,058,114 A | * | 5/2000 | Sethuram et al. | 370/397 |
| 6,075,791 A | * | 6/2000 | Chiussi et al. | 370/412 |
| 6,091,709 A | * | 7/2000 | Harrison et al. | 370/235 |
| 6,104,700 A | * | 8/2000 | Haddock et al. | 370/235 |
| 6,134,217 A | | 10/2000 | Stiliadis et al. | |
| 6,148,324 A | * | 11/2000 | Ransom et al. | 718/105 |
| 6,262,983 B1 | * | 7/2001 | Yoshizawa et al. | 370/389 |
| 6,272,109 B1 | * | 8/2001 | Pei et al. | 370/230 |
| 6,292,489 B1 | * | 9/2001 | Fukushima et al. | 370/392 |
| 6,636,481 B1 | * | 10/2003 | Yamaguchi et al. | 370/230 |
| 6,704,346 B1 | * | 3/2004 | Mansfield | 370/330 |
| 6,714,517 B1 | * | 3/2004 | Fawaz et al. | 370/236 |

(Continued)

FOREIGN PATENT DOCUMENTS

GB    2 349 296    10/2000

OTHER PUBLICATIONS

Downey T: "Overview of tag switching" Electronics Industries Forum of New England, 1997. Professional Program Proceedings Boston, MA, USA May 6-8, 1997, New York, NY, USA, IEEE, US. May 6, 1997. pp. 61-66, XP010234255.

*Primary Examiner* — Ricky Ngo
*Assistant Examiner* — Phuongchau B Nguyen
(74) *Attorney, Agent, or Firm* — Sughrue Mion, PLLC

(57) ABSTRACT

A method for packet reordering in a network processor, including the steps of processing packets, dividing the processed packets into a plurality of tiers and reordering the tiers independently from each other and collecting eligible packets from the plurality of tiers in a collector for forwarding. The method further includes the step of during the processing, determining the nominal packet processing time of each packet. The processed packets are divided into the plurality of tiers depending on the nominal packet processing time.

10 Claims, 3 Drawing Sheets

U.S. PATENT DOCUMENTS

| | | | |
|---|---|---|---|
| 6,714,546 B1 * | 3/2004 | Watanabe et al. | 370/395.2 |
| 6,751,194 B1 * | 6/2004 | Ueno | 370/412 |
| 6,801,530 B1 * | 10/2004 | Brandt et al. | 370/392 |
| 6,826,147 B1 * | 11/2004 | Nandy et al. | 370/229 |
| 6,985,441 B1 * | 1/2006 | Acharya | 370/231 |
| 6,990,120 B1 * | 1/2006 | Lindgren et al. | 370/468 |
| 7,050,403 B2 * | 5/2006 | Mononen | 370/252 |
| 7,095,715 B2 * | 8/2006 | Buckman et al. | 370/230 |
| 7,130,277 B2 * | 10/2006 | Fujii et al. | 370/474 |
| 7,130,307 B2 * | 10/2006 | Nakamura et al. | 370/395.5 |
| 7,149,184 B2 * | 12/2006 | Takada et al. | 370/230 |
| 7,158,519 B2 * | 1/2007 | Kanakubo | 370/392 |
| 7,215,637 B1 * | 5/2007 | Ferguson et al. | 370/230.1 |
| 7,366,165 B2 * | 4/2008 | Kawarai et al. | 370/394 |
| 2001/0048690 A1 * | 12/2001 | Magill et al. | 370/415 |
| 2002/0044563 A1 * | 4/2002 | Magill et al. | 370/411 |
| 2002/0091852 A1 * | 7/2002 | Frazier et al. | 709/232 |
| 2002/0122387 A1 * | 9/2002 | Ni | 370/231 |
| 2002/0122424 A1 * | 9/2002 | Kawarai et al. | 370/394 |
| 2003/0053485 A1 * | 3/2003 | Chuah et al. | 370/469 |
| 2003/0076848 A1 * | 4/2003 | Bremler-Barr et al. | 370/412 |
| 2003/0081600 A1 * | 5/2003 | Blaker et al. | 370/389 |
| 2003/0126272 A1 * | 7/2003 | Corl et al. | 709/230 |

* cited by examiner

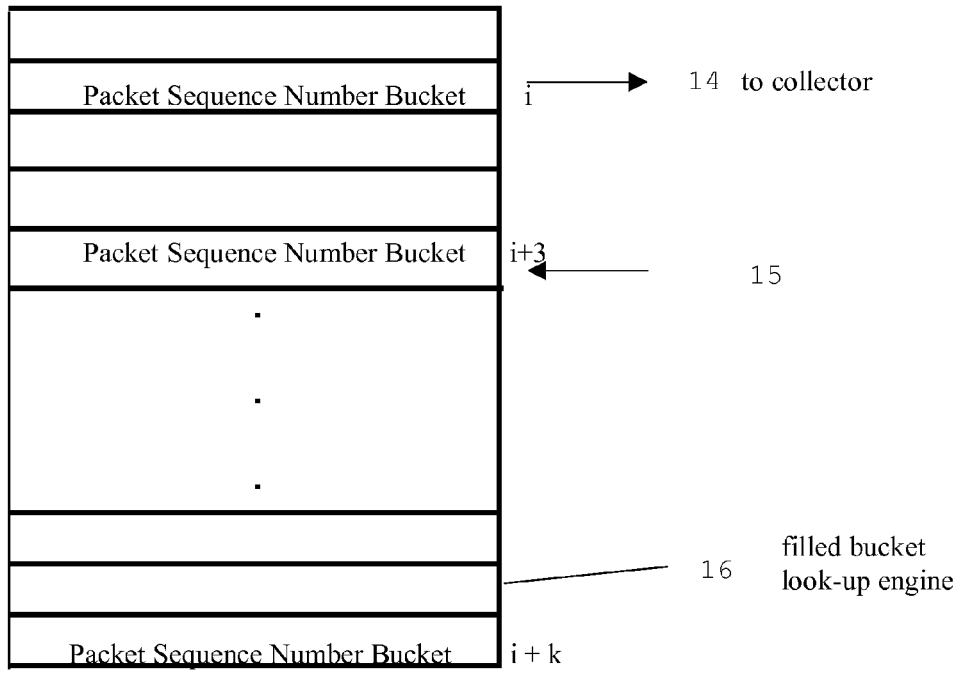
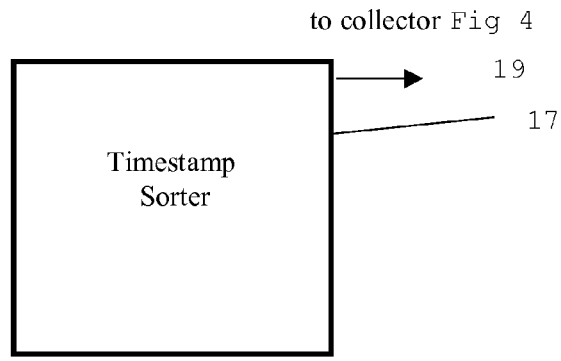
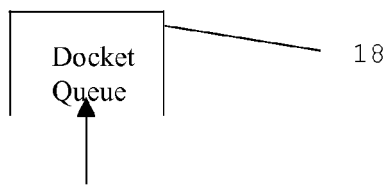
Fig 5

METHOD AND APPARATUS FOR PACKET REORDERING IN A NETWORK PROCESSOR

The present invention is related to an Internet Protocol (IP) router or a Multiprotocol Label Switching (MPLS) router and network processors for routing packets over a network. Further, the present invention is related to a method for routing packets over a network.

High quality Internet Protocol (IP) and Multiprotocol Label Switching (MPLS) routers use network processors (NP) for their packet forwarding tasks. These network processors are programmable devices optimised (optionally with dedicated hardware auxiliary circuits) to do the processing of e.g. IP and MPLS protocols. As a single processor is hardly able to process at wirespeed the 25 to 100 million packets per second of Optical Carrier interfaces, many network processors use a multiprocessor engine whereby each of the engines may run multiple threads. In such architecture, multiple packets are processed at the same time. As the processing time of an individual packet may vary, a dedicated function is required to ensure that the network processor maintains packet order.

The packet reordering function in state of the art network processors is engineered to keep packet order only between relevant packets, i.e. typically packets of the same end to end flow. As the reordering between end to end flows is not scalable, means are introduced, such as a hashing function based on packet parameters, in order to classify packets in "classes". This is performed before the packet processing is started. Within such a class, the packet order is maintained.

The above solution does not classify packets based on their processing time. It is even not possible to do so, as the processing time is only known when packet processing is ongoing or finished. Hence the prior art solution, i.e. classification based on a hashing function, results in a classification of packets with a large variety in processing time within each of the classes. The reordering of the packets within such a class may not be very efficient because the reordering element of the network processor has to wait for the packet with the largest processing time before all packets can be reordered and sent out subsequently. The network processor is not utilised efficiently during this waiting time.

The present invention aims to provide a novel method and apparatus for forwarding packets efficiently in a network processor.

The present invention concerns a method for packet reordering in a network processor, comprising the steps of:
  Processing packets,
  Dividing the processed packets into a plurality of tiers, and
  Reordering the packets in the tiers independently from each other and collecting eligible packets from the plurality of tiers in a collector for forwarding,
    characterised in that the method further comprises the step of, during the processing of the packets determining the nominal packet processing time of each packet and that said processed packets are divided into said plurality of tiers depending on said nominal packet processing time.

Preferably, the step of determining the nominal packet processing time comprises the steps of:
  Determining the actions required to process said packet type, and
  Determining the nominal packet processing time by adding up all the nominal processing times for the actions required to process said packet.
Further, the processing time is advantageously expressed in time units, such as real time but more preferably time tokens, indicating a relative time within the network processor. Such tokens can provide quicker processing of time data.

The method for packet reordering of the present invention can further be characterised in that the plurality of tiers comprises one first tier and at least one subsequent tier, said first tier being used for transfer of short processing time packets.

A suitable sorting algorithm for the first tier can e.g. be based on the sequence number of the packet. The suitable sorting algorithm for the subsequent tiers can e.g. be based on the timestamp of the packet.

The step of collecting eligible packets from the groups in a collector for forwarding can comprise a selection of a tier according to a weighed round robin algorithm.

In a preferred embodiment of the present invention, a packet from a tier is eligible for collecting if the actual time is later than the timestamp of said packet+the maximum processing time of a packet associated to said tier.

Another embodiment of the present invention concerns a reordering unit implementing the method of the present invention.

A further embodiment of the present invention is a network processor comprising the reordering unit of the present invention.

FIGS. 4 and 5 respectively show the reordering principles in tier 1 and in tier 2 and up.

Figure 6:
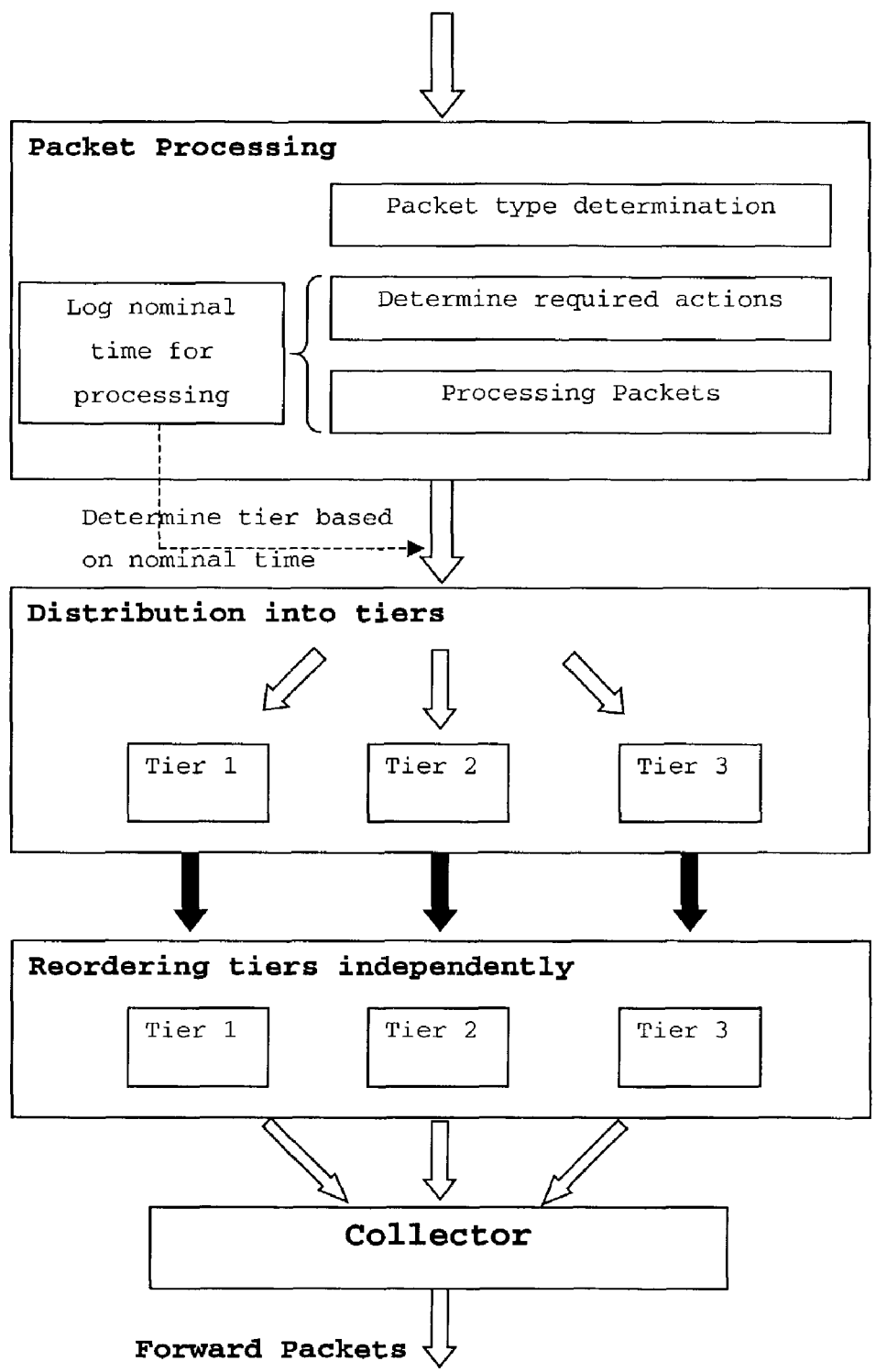

FIG. 6 is a flowchart in which the packet flow in a network processor according to the present invention is represented.

The present invention, which provides a solution to the problems of the state of the art concerns packet classification by the network processor during packet processing. This classification is based on the processing method and corresponding time. Each class of this new reordering principle corresponds to a packet processing time interval, a result of the applied processing method(s). The processing time intervals of two classes may be (partly) overlapping. The reordering of packets in a particular class only has to cope with a well known processing time interval defined for that class, which is much smaller than the global delta processing time of all packets processed by the Network processor (NP).

The solution can be applied to reorder traffic in one packet processing component or between multiple packet processing components.

The network processor code is able to make a classification of the packets based on processing time and method at packet processing time. The code overhead is very small. This classification allows one to organise the reordering per class, whereby the delta processing time of packets in one class is much smaller than the overall delta processing time. The present invention will now be illustrated by an example of an embodiment.

Figure 1:
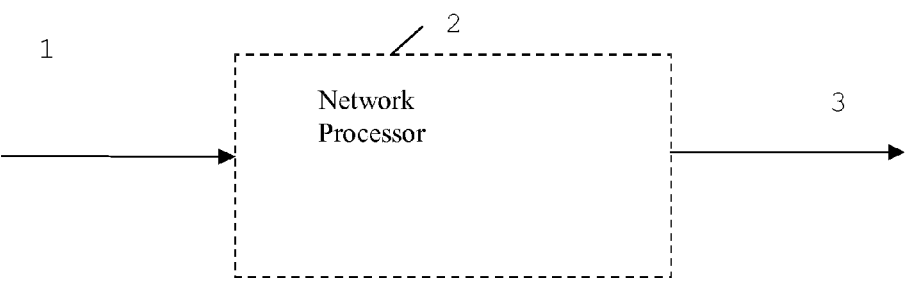
FIG. 1 illustrates the general setting of a network processor.

FIG. 1 shows the traditional set-up of a Network Processor (NP). A network processor 2 is set up to receive packets 1 and to forward these packets to their destination, the output of a NP is referred to as processed packets 3.

Figure 2:
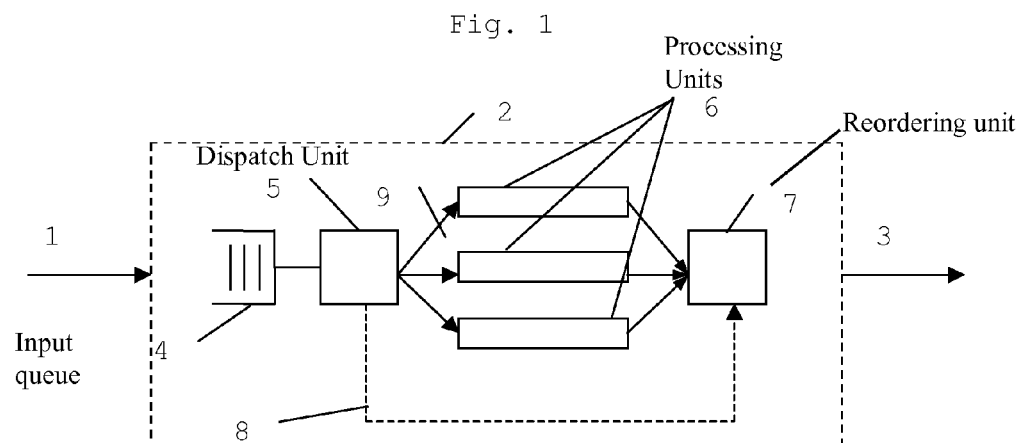
FIG. 2 represents the data flow in a multiprocessor network processor according to the present invention.

FIG. 2 shows a more detailed scheme of a NP (2). Incoming packets 1 are put into an input queue 4, which is fed to a dispatch unit 5. This dispatch unit 5 redistributes the packets over a plurality of processing units 6, which will collect the packets into reordering unit 7 after processing the packets. The reordering unit 7 finally outputs processed packets 3 to their destination.

Packets are foreseen of parameters such as a packet reference number, a timestamp, and a sequence number. Typically, all or some of the parameters need to be read and/or passed onto the next level to allow proper treatment in the reordering unit. E.g. between the dispatch unit 5 and the processing units 6, packet reference numbers are passed (9), while the dispatch unit 5 passes packet reference numbers, timestamps and sequence numbers to the reordering unit 7 (8).

Processing of a packet by a processing unit consists of a sequence of actions. A different type of packet will require a different type of processing, which is reflected in a different combination (a different sequence) of actions. Every possible action also has its nominal processing time.

For example:

| Packet type | Processing sequence |
|---|---|
| Type 1 | A1–A5 |
| Type 2 | A1–A2–A3–A4–A5 |
| Type 3 | A1–A2–A3 |

And the nominal processing times for the possible actions:

| Action | Nominal Processing time |
|---|---|
| A1 | Time 1 |
| A2 | Time 2 |
| A3 | Time 3 |
| A4 | Time 4 |
| A5 | Time 5 |

It is also possible to replace the nominal processing time by a number of processing time tokens, for ease of implementation. Each token represents e.g. a processing time unit.

During the processing of a packet, each action is logged. A packet is thus associated to a specific processing time which can be calculated by addition of all the nominal processing times for all the actions required to process the packet. For type 3, the total processing time will thus be equal to time 1+time 2+time 3. Further, all packets are associated to an array logging the processing actions, so for a processed packet of type 3, the array looks like

| A1 | A2 | A3 | A4 | A5 |
|---|---|---|---|---|
| 1 | 1 | 1 | 0 | 0 |

Figure 3:
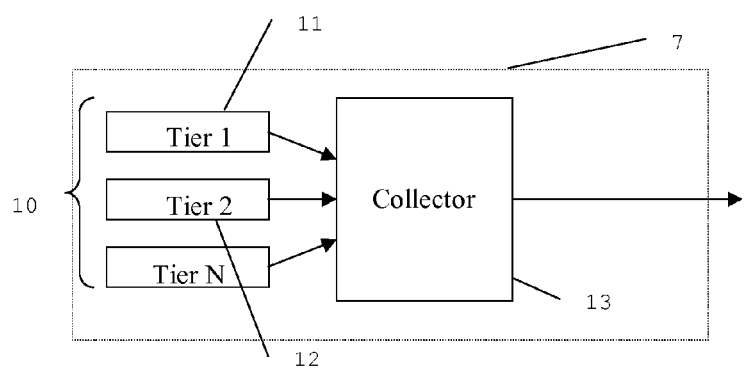
FIG. 3 shows the data flow in a reordering unit according to the present invention.

The total nominal processing time is used to assign it to a tier (10), as can be seen on FIG. 3. The different tiers each handle a specific nominal packet processing range:

| Nominal processing time ranges | Selected tier |
|---|---|
| Range A | Tier 1 |
| Range B | Tier 2 |
| Range C | Tier 3 |

The ranges are non-overlapping, so that every packet is associated with only one nominal processing time, which is only associated with one tier. Every processed packet can thus be assigned to only one processing tier.

Packets arriving at their assigned tier, have to be reordered before they are passed on to a collector 13 which is at the end of the network processor. Since all packets that are present in a tier have about the same processing time (the difference between processing times of different packets is small since the tier assignment was done on the basis of processing time), the tier reordering can be optimised to suit the needs. E.g., tier 1 (11) can be used for fast processed packets, while tier 2 (12) and up can be used for packets with medium or long processing time.

If different tiers have a reordered packet waiting for collection, the collector 13 can collect the packets in a weighted round robin mode (the lower tiers may have e.g. higher weights).

FIG. 4 shows an advantageous reordering principle for tier 1 in such a set-up.

A filled bucket lookup engine 16 is used. Processed packets are directly inserted in the corresponding sequence number bucket (15). A packet is eligible to be passed (14) to the collector 13 if the actual time is later than the timestamp+the maximum processing time of a packet associated to tier 1 or if the packet has the sequence number following the sequence number of the previously collected packet of tier 1. This reorder engine can work at wirespeed and treats typically the fastest processed packets.

FIG. 5 draws the reordering in tier 2 and up and is based on time equalising sorting such as for an n-airy tree. Packets arriving in a FIFO queue 18 are sorted on their timestamp (17). A packet is eligible for transfer (19) to the collector 13 if it is at the head of the timestamp sorter 17 and if the actual time is later than the actual timestamp+the maximum processing time of a packet associated to the corresponding tier.

Effects of the Present Invention

The reordering unit can handle higher delta processing times than currently known implementations, without sacrificing processing resources.

There is no need to implement a packet classifier function (e.g. based on hashing) before packets are processed.

An overview of the packet flow in a network processor according to the present invention is given in FIG. 6. Arrows represent the packet flow. Packet processing, preferably performed by determining the packet type and processing the packet accordingly, is performed first. On the basis of the packet nominal processing time, associated to a packet on the basis of the nominal processing time required for the actions required to process that packet type, the packets are distributed into a plurality of tiers, which are reordered independently. A collector selects eligible packets from the reordered tiers and forwards the packets to their destination.

The invention claimed is:

1. A method for packet reordering in a network processor, comprising the steps of:
    a. processing packets;
    b. dividing the processed packets into a plurality of tiers; and
    c. reordering said tiers independently from each other and collecting eligible packets from said plurality of tiers in a collector for forwarding,
    wherein said method further comprises the step of, during said processing, determining a nominal amount of packet processing time of each packet in said processing step and that said processed packets are divided into said plurality of tiers depending on said nominal amount of packet processing time.

2. The method for packet reordering as in claim 1, wherein the step of determining said nominal amount of packet processing time comprises the sub-steps of:
   a. determining actions required to process said packet in said processing step; and
   b. determining the nominal amount of packet processing time by adding up all the nominal processing time amounts for said actions.

3. The method for packet reordering such as in claim 1, wherein the processing time amount is expressed in time units.

4. The method for packet reordering according to claim 1, wherein the plurality of tiers comprises one first tier and at least one subsequent tier, said first tier being used for transfer of short processing time packets.

5. The method for packet reordering such as in claim 4, wherein the suitable sorting algorithm for the first tier is based on the sequence number of the packet.

6. The method for packet reordering such as in claim 4, wherein a suitable sorting algorithm for the subsequent tiers is based on a timestamp of the packet.

7. The method for packet reordering such as in claim 1, wherein the step of collecting eligible packets from the groups in a collector for forwarding comprises a selection of a tier according to a weighted round robin algorithm.

8. The method for packet reordering such as in claim 7, wherein a packet from a tier is eligible for collecting if an actual time is later than a timestamp of said packet plus the maximum amount of processing time of a packet associated with said tier.

9. A reordering unit implementing a method for packet reordering in a network processor, said network processor comprising means for processing packets and for dividing the processed packets into a plurality of tiers, and means for reordering said tiers independently from each other and collecting eligible packets from said plurality of tiers in a collector for forwarding, said means for processing determining a nominal amount of packet processing time of each packet and dividing said processed packets into said plurality of tiers depending on said nominal amount of packet processing time.

10. A network processor for use in a reordering unit for implementing a method for packet reordering, said processor comprising means for processing packets and for dividing the processed packets into a plurality of tiers, and means for reordering said tiers independently from each other and collecting eligible packets from said plurality of tiers in a collector for forwarding, said means for processing including means for determining a nominal amount of packet processing time of each packet in said processing step and for dividing said processed packets into said plurality of tiers depending on said nominal amount of packet processing time.

\* \* \* \* \*